United States Patent [19]

Ray

[11] Patent Number: 4,829,969
[45] Date of Patent: May 16, 1989

[54] SPIRAL DISTRIBUTOR FUEL HEATER

[75] Inventor: Dennis A. Ray, Crookston, Minn.

[73] Assignee: Energy Research and Marketing Corporation, Crookston, Minn.

[21] Appl. No.: 186,939

[22] Filed: Apr. 27, 1988

[51] Int. Cl.⁴ .......................................... F02M 31/00
[52] U.S. Cl. ..................................... 123/557; 123/545
[58] Field of Search ............................. 123/557, 545

[56] References Cited

U.S. PATENT DOCUMENTS

| | | | |
|---|---|---|---|
| 2,821,843 | 2/1958 | Mengelkamp et al. | 123/557 |
| 4,300,513 | 11/1981 | Ray | 123/545 |
| 4,367,717 | 1/1983 | Ray | 123/557 |
| 4,585,924 | 4/1986 | Pakula | 123/557 |
| 4,653,456 | 3/1987 | Mourgeon | 123/557 |
| 4,722,314 | 2/1988 | Martinson | 123/557 |

OTHER PUBLICATIONS

"The Climate Controller Fuel System" published in 1-1984 by Controlled Fuel Systems.

*Primary Examiner*—Willis R. Wolfe
*Assistant Examiner*—M. Macy
*Attorney, Agent, or Firm*—Palmatier & Sjoquist

[57] ABSTRACT

A fuel heating device for internal combustion engines using engine coolant to heat the fuel prior to the introduction of the fuel into the carburetor and utilizing a spiral distributor to evenly heat the fuel and eliminate vapor lock. The spiral distributor provides a means for spiraling the fuel through a heat transfer chamber to evenly heat the fuel and decrease the amount of vaporized fuel created by heating the fuel.

10 Claims, 4 Drawing Sheets

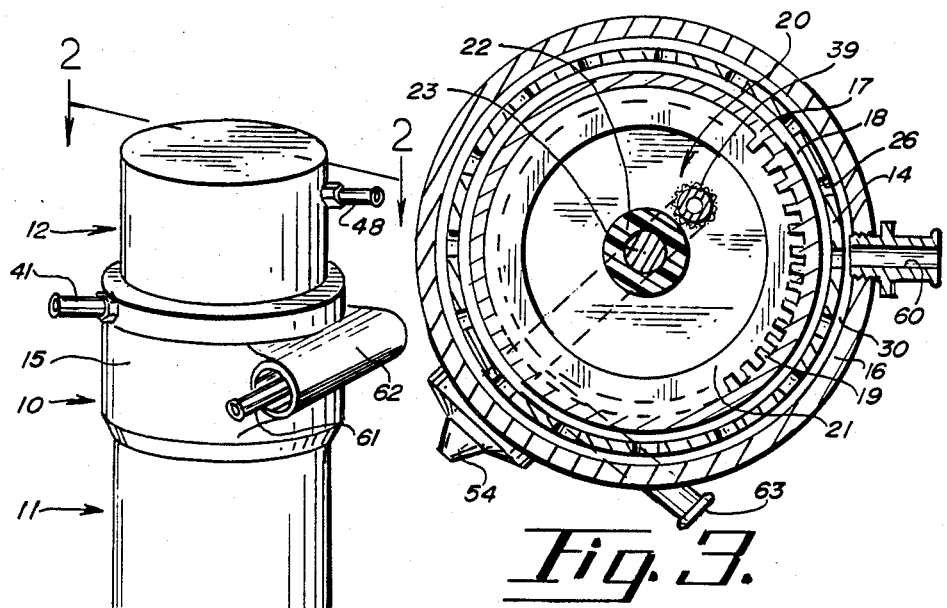
Fig. 1.
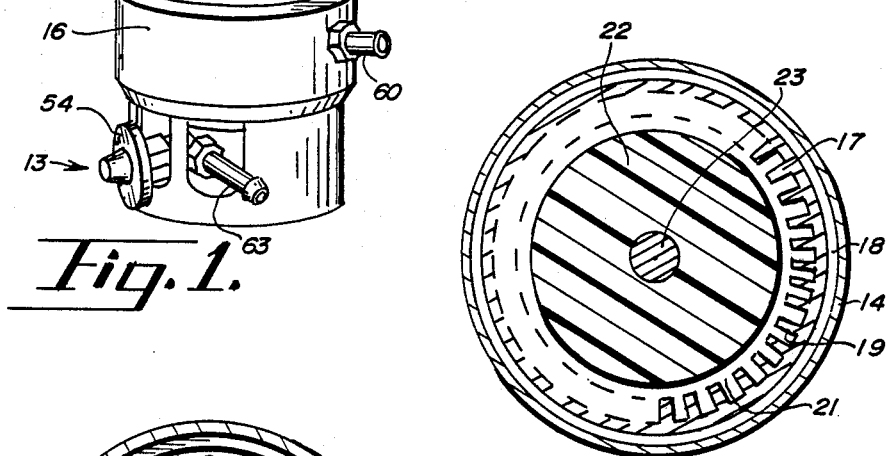
Fig. 3.
Fig. 4.
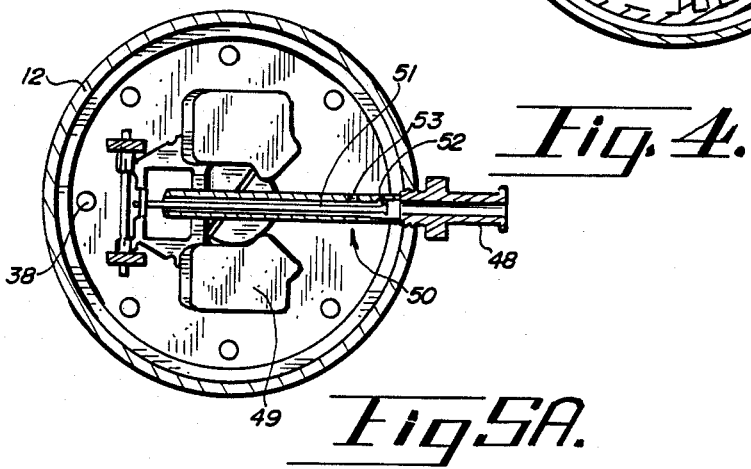
Fig 5A.

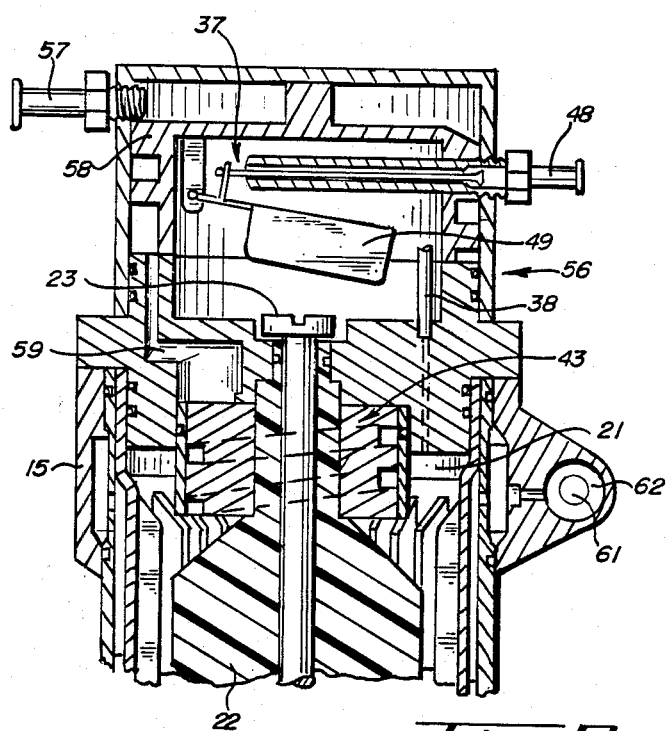

SPIRAL DISTRIBUTOR FUEL HEATER

CROSS REFERENCE TO RELATED APPLICATION

This application is generally related to my copending application Ser. No. 121,672, filed on Nov. 17, 1987 still pending.

BACKGROUND OF THE INVENTION

This invention relates to internal combustion engines, and more particularly, to devices that preheat fuel for the carburetors of these engines.

It is well known that heating fuel prior to its introduction into the carburetor, increases the combustion efficiency of these engines. There are many obstacles to overcome when designing a fuel heating device. The object of these fuel heaters is to provide the carburetor with fuel that is warmed to a predetermined temperature. The heat output of the fuel heater must be adjustable to satisfy the varying amounts of heat necessary to heat the fuel whether the car is idling or accelerating. The heater must also work within a wide range of environmental temperatures. The heat required from the heater at warm temperatures is much less than the heat required when the outside temperature is below zero.

One of the primary problems facing current fuel heater designs is vapor lock. Vapor lock occurs when there is uneven heating of the fuel or if the fuel heater cannot adjust to a sudden increase in the demand for fuel. When this occurs, a portion of the fuel vaporizes and blocks movement of the remaining heated fuel through the fuel heater. The car is virtually useless until the vaporized fuel cools. If vapor lock occurs with any regularity, the device will not be accepted by the public.

The fuel heaters must also be inexpensive to manufacture and easy to install. The savings from this device occurs over a long period of time, and many people will not purchase it if there is a large initial investment. The prior art contains many attempts to overcome the problems faced when designing a fuel heater. In U.S. Pat. No. 4,146,002, issued to Quinn, on Mar. 27, 1979, the fuel is heated by passing it through a helically shaped tubing that is surrounded by engine coolant. My prior invention U.S. Pat. No. 4,367,717, issued Jan. 11, 1983, also utilizes engine coolant to heat the fuel. In my invention, the fuel is passed through a heat exchanger which heats and regulates the fuel temperature as it passes into the carburetor. My invention, as well as many others, has numerous machine parts and is expensive to manufacture.

The prior art has demonstrated that the use of fuel heaters increases fuel economy and decreases the amount of unburned fuel released into the environment. The prior fuel heaters have not provided the public with a reliable, inexpensive fuel heater. It is accordingly clear that a need remains in the art for a fuel heater that will overcome the disadvantages of the current fuel heaters.

SUMMARY OF THE INVENTION

An object of this invention is to produce a reliable inexpensive fuel heater that can be adjusted to fit any type of automobile.

Another object of this invention is to provide a fuel heater that evenly heats the fuel and is capable of providing fuel to the carburetor at a predetermined temperature.

Another object of this invention is to provide a fuel heater that is able to provide heated fuel to the carburetor at varying rates of flow and will not create vapor lock.

This invention features an elongated circular canister section with attached top and bottom covers. The canister section consists of three concentric walls, the outer wall is the canister wall, the middle wall is the heat transfer wall and the inner wall is the core wall. The top cover contains a float chamber, a vapor outlet and a fuel inlet. The bottom cover contains a fuel outlet for delivering the heated fuel to the carburetor.

The canister wall of the canister section contains a pair of annular recesses located near the top and bottom ends of the wall. These annular recesses contain inlet and outlet passages which provide a passageway for engine coolant into the fuel heater. Rotably mounted on the outer surface of these annular recesses are a pair of annular coolant rings. The bottom annular coolant ring contains a coolant inlet for the passage coolant into the fuel heater from the engine coolant system. The top annular ring contains a coolant outlet in flow communicating relation with a flow control mechanism such as a thermostat or solenoid. A mounting bracket is rotably mounted on the outer surface of the canister wall between the annular coolant rings.

The second wall o the canister section is the heat transfer wall. The outer surface of the heat transfer wall contains outwardly projecting rims which are attached to the top and bottom covers by a series of O-rings. The outer surface of the heat transfer wall communicates with the inner surface of the canister wall to define an annular coolant flow passageway. The interior surface of the heat transfer wall has multiple inwardly projecting fins.

The inner wall of the canister section is the core wall. The core wall consists of an insulating plastic sleeve which surrounds a center bolt. This center bolt extends from the middle of the top cover, through the canister section of the fuel heater and into the bottom cover. The core wall and the heat transfer wall cooperate to define the heat transfer chamber. The top of the heat transfer chamber contains multiple small diameter vapor ports which open into the float chamber located in the top cover. The bottom of the heat transfer chamber contains a small meshed screen through which the heated fuel enters the bottom cover.

The lower portion of the top cover contains a fuel inlet for fuel from the engine fuel system. In line with the fuel inlet is a check valve assembly. A spiral distributor is located in flow communicating relation with and below the check valve. The spiral distributor consists of an outer ring with an inner spiral core. The inner spiral core fits frictionally within the outer ring and is supported by the center bolt and the top of the insulating plastic sleeve. The bottom of the spiral core opens into the top of the heat transfer chamber.

The upper portion of the top cover contains a float chamber. The vapor ports from the heat transfer chamber open into the bottom of the float chamber. The float chamber contains a float assembly which consists of a lower float suspended from an upper vapor tube. The vapor tube contains multiple bleed ports and is connected to the vapor outlet and fuel return line.

The bottom cover contains a fuel outlet for delivery of the heated fuel to the carburetor. There is also a flow line from the heat transfer chamber to the fuel outlet. At the top of the flow line, there is a fuel filter and an insulator ring which fits between the bottom of the heat transfer chamber and the top of the bottom cover. The fuel outlet contains a pressure regulator which is in flow communicating relation with the fuel line to the carburetor.

In an alternate form of the top cover, the fuel enters the fuel heater at the top of the top cover through the fuel inlet. In flow communicating relation with the fuel inlet is a top spiral distributor which extends from the top of the top cover to the bottom of the top cover. The bottom of the top spiral distributor communicates with the top of the spiral distributor.

In operation, the fuel enters the fuel heater through the fuel inlet located in the top cover. The fuel then flows past a check valve which prevents the back flow of the fuel to the fuel tank. After the fuel passes the check valve, it enters the top of the spiral distributor. The fuel is spun through the grooves in the spiral distributor and flows into the top of the heat transfer chamber. In the heat transfer chamber, the fuel flows between the fins of the heat transfer wall and the inner core. The fuel is uniformly heated by the conduction of heat from the fins of the heat transfer wall. The insulating plastic sleeve of the core wall also maintains a constant heating temperature for the inner surface of the heat transfer chamber.

The fuel swirls through the heat transfer chamber until it reaches the bottom cover of the fuel heater. The fuel then passes through a small meshed screen and into the flow line located in the bottom cover. The heated fuel passes by the bottom insulator and into the pressure regulator. The pressure regulator controls the flow of the fuel to the carburetor and includes a fuel, bypass to return the excess heated fuel back into the fuel line at a point prior to the fuel heater.

The engine coolant enters the fuel heater through the lower annular coolant ring. The coolant passes through the annular recesses located on the canister wall and into the coolant distribution passage where it heats the heat transfer wall. The coolant flows upwardly through the coolant distribution passage to the top of the canister section. At the top of the canister section, the coolant passes through the upper annular recess and out of the fuel heater through the top annular coolant ring. In flow communicating relation with the top annular coolant ring is a thermostat which maintains the temperature of the coolant within a predetermined range. Once the coolant flows past the thermostat, the coolant returns to the engine coolant system.

Vaporized fuel from the heat transfer chamber passes through the vapor ports in the top cover and into the float chamber. Once in the float chamber, the vaporized fuel cools and returns to the heat transfer chamber through the vapor ports in its liquid state. As the amount of vapor increases in the float chamber, the float is lowered and the vapor tube opens to allow fuel vapors to return to the fuel line through the vapor outlet. Tee vapor tube also contains bleed ports to enable a constant amount of fuel vapors to return to tee fuel line.

In the alternate form of the top cover, the fuel enters the fuel heater through a fuel inlet located at the top of the top cover. The fuel spirals through the top cover and into the spiral distributor. By spiraling the fuel around the float chamber in the spiral cover, the vaporized fuel in the float chamber is cooled more rapidly and less fuel returns to the fuel line through the vapor outlet.

An advantage of the present invention is that the fuel is evenly heated in the heat transfer chamber. By spiraling the fuel through the heat transfer chamber, the fuel is heated faster and there is less vaporization of the fuel.

Another advantage of this invention is that it is easily assembled and may be adapted to fit any engine compartment. Another advantage of this invention is that the flow regulator restricts the flow of the heated fuel until there is an increased demand for the fuel by the carburetor.

Another advantage of this invention is that the center bolt no longer interferes with the float chamber assembly.

Another advantage o this invention results from the use of the alternate spiral cover. The outer spiraling of the fuel around the float chamber cools the vaporized gas in the float chamber and eliminates the need for bleed ports in the float chamber.

BRIEF DESCRIPTION OF THE DRAWINGS

FIG. 1 is a perspective view of the fuel heater;

FIG. 3 is a detailed sectional view of the bottom cover taken along line 3—3 of FIG. 2;

FIG. 4 is a detailed sectional view of the fuel heater taken along line 4—4 of FIG. 1;

FIG. 5A is a detailed sectional view of the float chamber taken along line 5A—5A of FIG. 2;

FIG. 8 is a detailed sectional view of the alternate top cover illustrating the top spiral distributor.

DESCRIPTION OF THE PREFERRED EMBODIMENT

Figure 2:
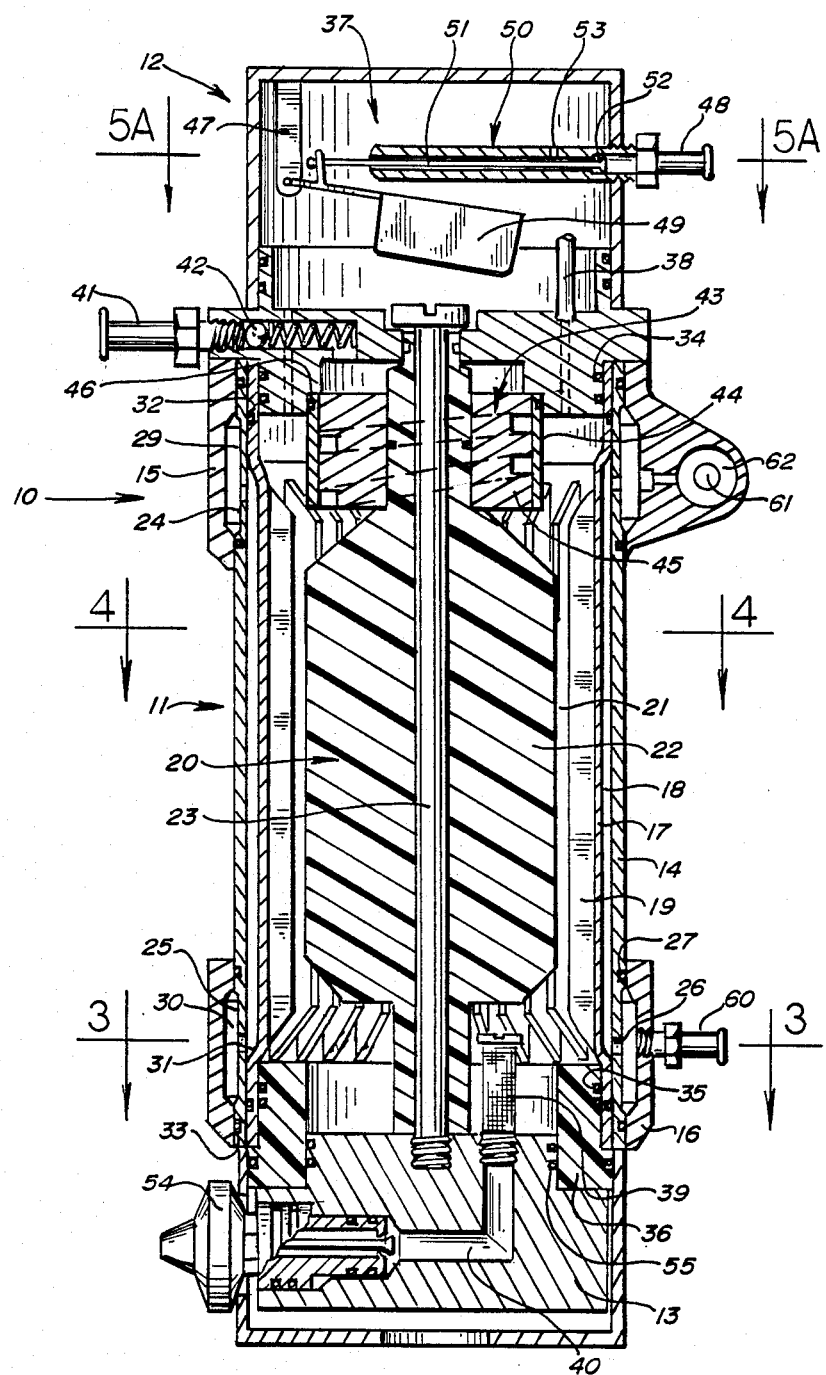
FIG. 2 is a detailed sectional view of the fuel heater taken along line 2—2 of FIG. 1.
Figure 5B:
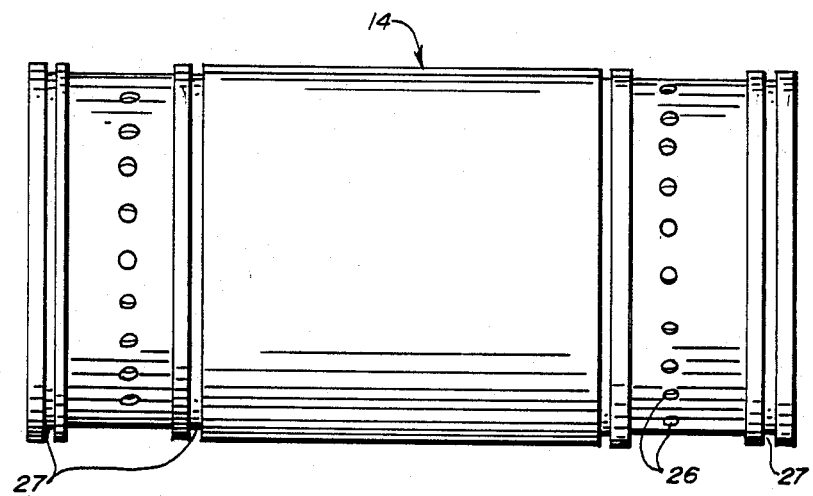
FIG. 5B is a detailed view of the outer wall of the fuel heater.
Figure 6:
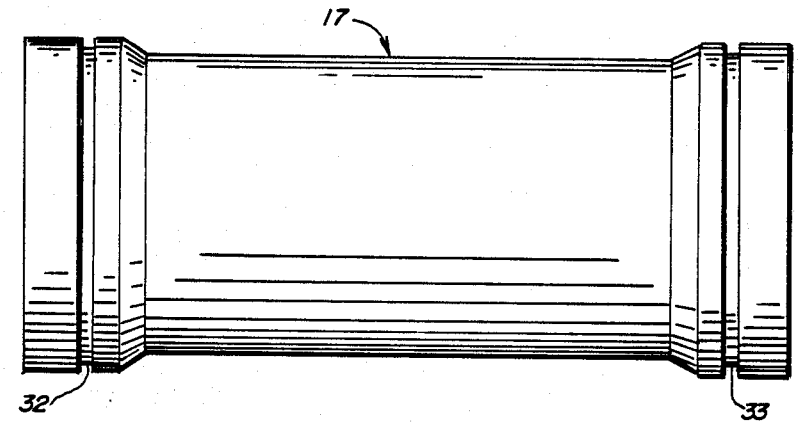
FIG. 6 is a detailed view of the heat transfer wall of the fuel heater.
Figure 7:
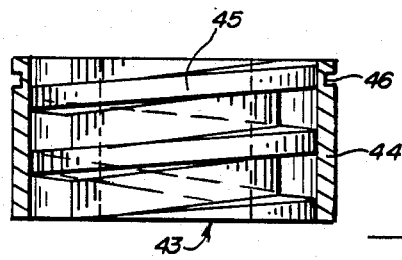
FIG. 7 is a detailed sectional view of the spiral distributor of the fuel heater.

One form of the improved fuel heater is described herein and referred to generally as 10. The fuel heater 10 has as its principal parts, an elongate annular canister section 11, a top cover 12 and a bottom cover 13. The canister section 11 consists of three concentric walls. The first concentric wall is the canister wall 14 which extends from the top cover 12 to the bottom cover 13 and has a pair of annular coolant rings 15 and 16 mounted near its top and bottom ends. The next concentric wall is the heat transfer wall 17, which in combination with the outer wall 14, forms a coolant distribution passageway 18. The inner surface of the heat transfer wall 17 has multiple inwardly projecting fins 19. The inner most concentric wall is the inner core 20 which cooperates with the heat transfer wall 17 to form a heat transfer chamber 21. The inner core 20 consists of an insulating plastic sleeve 22 which surrounds a center bolt 23.

The canister wall 14 is an elongate aluminum cylinder which has a pair of top and bottom annular recesses 24 and 25. These annular recesses 24 and 25 contain evenly spaced coolant passages 26 which open into the coolant distribution passageway 18. Above and below each annular recess 24 and 25 are concentric O-ring and groove assemblies 27 to rotably mount the annular coolant rings 15 and 16. A mounting bracket (not shown) is located between the annular coolant rings 15 and 16 to aid in placement of the rings. These annular coolant rings 15 and 16 are mounted in communicating relation with the annular recesses 24 and 25 to form coolant manifolds 29 and 30. The canister wall 14 forms a leak proof seal with the top and bottom covers 12 and 13 when the center bolt 23 is tightened.

Inwardly of the canister wall 14 is the heat transfer wall 17. This wall is constructed of aluminum and contains an inwardly projecting circumferential recess 31 which cooperates with the inner surface of the outer wall 14 to define the collant distribution passageway 18. The end portions of the heat transfer wall 17 have a larger outside diameter so as to slidably fit within the outer wall 14 of the canister section 11. These end portions have O-ring and groove assembles 32 and 33 on their outer surface to form a tight seal with the inner surface of the canister wall 14. The inner surface of the end portions on the heat transfer wall 17 contact O-ring and groove assemblies 34 and 35 on the top cover 12 and the insulating ring 36 of the bottom cover 13.

The inner surface of the heat transfer wall 17 contains multiple inwardly projecting fins 19. These fins 19 extend into the heat transfer chamber 21 to interrupt the flow of the fuel through the heat transfer chamber 21. These fins 19 increase the conduction of heat from the heat transfer wall 17 to the fuel by providing a large heat transfer surface.

Inwardly of the heat transfer wall 17 is the inner core 20 consisting of an insulating plastic sleeve 22 which surrounds the center bolt 23. The plastic sleeve 22 extends from the top cover 12 to the bottom cover 13. The center bolt 23 extends downwardly from the bottom of the float chamber 37 and is threaded into the bottom cover 13.

The heat transfer chamber 21 is surrounded by the heat transfer wall 17, the top cover 12 and the bottom cover 13. The top of the heat transfer chamber 21 contains vapor ports 38 which extend through bottom of the top cover 12 and into the bottom of the float chamber 37. At least one of the vapor ports 38 extends above the bottom surface of the float chamber 37. The bottom of the heat transfer chamber 21 contains a round fuel filter 39 which extends upwardly from the fuel flow line 40 of the bottom cover 13.

The top cover 12 is constructed of aluminum and contains an upper float chamber 37 and a lower fuel inlet area. The fuel inlet area contains a fuel inlet 41 mounted on the outer surface of the top cover 12. In line with the fuel inlet 41 is a check valve 42 to block the flow of fuel back into the fuel tank. In flow communication with the fuel inlet 41 and check valve 42 is a spiral distributor 43. The spiral distributor 43 consists of an outer annular distributor ring 44 and an inner spiral 45 which is frictionally held in position by the top cover 12 and the plastic sleeve 22 of the inner core 20. The inner spiral 45 is further held in position by the center bolt 23 which passes vertically through the center of the spiral 45. The distributor ring 44 is held tightly within the top cover 12 by an O-ring and groove assembly 46. The bottom of the spiral distributor 43 opens into the heat transfer chamber 21.

The float chamber 37 includes a float assembly 47, a vapor outlet 48, vapor ports 38 from the heat transfer chamber 21 and the top of the center bolt 23. The float assembly 47 includes a lower float 49 which is moveably connected to a vapor tube 50. The vapor tube 50 consists of a hollow tube 51, a vapor valve 52 and bleed ports 53. The bleed ports 53 are located on the end of the hollow tube 51 located nearest the vapor outlet 48 and bypass the vapor valve 52 to enable the float assembly 47 to bleed a steady amount of vapor from the float chamber 37 through the vapor outlet 48 to a fuel return line (not shown). The head of the center bolt 23 is located at the bottom of the float chamber 37 to avoid interference with the operation of the float assembly 47.

The bottom cover 13 is constructed of aluminum and is held in position by tightening the center bolt 23. The bottom cover 13 contains a plastic insulating ring 36, a round fuel filter 39, a fuel flow line 40, a pressure regulator 54 and a fuel bypass 63. The aluminum section of the bottom cover 13 is attached to the insulating ring 36 by an O-ring and groove assembly 55. The pressure regulator 54 is attached in flow communication with the fuel flow line 40 and provides the outlet for delivery of the heated fuel to the carburetor.

In an alternate form of the top cover 56, the fuel enters the fuel heater 10 through a fuel inlet 57 located at the top of this top cover 56. The fuel is then spiraled through a top spiral distributor 58 which spirals the fuel around the enclosed float chamber 37. In line with the top spiral distributor 58 is a flow chamber 59 which communicates with the top of the spiral distributor 43 to enable the fuel to flow from the top spiral distributor 58 directly to the spiral distributor 43.

In operation, the fuel enters the fuel heater 10 through the fuel inlet 41 located in the lower portion of the top cover 12. The fuel then flows past the check valve 42 and into the spiral distributor 43. The fuel is spiraled through the spiral distributor 43 and into the heat transfer chamber 21. In the heat transfer chamber 21, the fuel is heated by the fins 19 on the heat transfer wall 17. Additionally, the fins 19 create turbulence in the spiraling fuel and increase the conduction of heat from the heat transfer wall 17 to the fuel. The fuel passes through the heat transfer chamber 21 and enters the round fuel filter 39 located on the bottom cover 13. Once the fuel passes through the round fuel filter 39, it flows through the fuel flow line 40 and into the pressure regulator 54. The pressure regulator 54 controls the rate of flow of the heated fuel from the regulator 54 to the carburetor and includes a fuel bypass 63 to allow the excess fuel to flow back into the fuel line.

The vaporized fuel passes from the top of the heat transfer chamber 21 and into the flow chamber 37 through the vapor ports 38. The float 49 floats at the liquid/fuel level and moveably communicates this level to the vapor valve 52. As the vapor in the flow chamber 37 increases, the float 49 will lower and open the vapor valve 52 to allow more vapor to pass from the float chamber 37 to the vapor outlet 48. The bleed ports 53 on the vapor tube bypass the vapor valve 52 and allow a steady amount of vapor to pass into the vapor outlet 48.

The coolant flows from the engine coolant system, through the lower coolant inlet 60 and into the coolant manifold 30. The coolant then flows past the coolant passages 26 and into the coolant distribution passageway 18. The coolant then flows up the coolant distribution passageway 18; through the top coolant passages 26 and into the coolant manifold 29. From the coolant manifold 29 the coolant flows through the coolant outlet 61 to a thermostat 62 located in flow communication with the coolant outlet 61 and engine coolant system.

In the alternate form of the top cover 56, the fuel enters the fuel heater 10 through the fuel inlet 57 located at the top of the top cover 56. The fuel is then spiraled through the top spiral distributor 58 and into the top flow chamber 59. From this flow chamber 59 the fuel passes into the second spiral distributor 43. From this second spiral distributor 43 the fuel spirals into the heat transfer chamber 21.

The use of the spiral in the alternate top cover 56 provides added cooling of the vaporized fuel in the float chamber 37 and significantly decreases the amount of vaporized fuel in the float chamber 37 during operation of the fuel heater 10. Additionally, the use of bleed ports 53 on the vapor tube 50 is no longer necessary due to the lower temperature and smaller amount of vaporized fuel in the flow chamber 37.

We claim:

1. A fuel heater for heating fuel with engine coolant, comprising
    an elongate annular canister having an annular canister wall with ends upon which transverse top and bottom covers are affixed,
    an elongate annular heat transfer wall affixed within the canister and extending from the top cover to the bottom cover along and in spaced relation with the annular canister wall to form an engine coolant passageway therebetween,
    an elongate annular core affixed within the canister and extending from the top cover to the bottom along and in space relation to the heat transfer wall to form a heat transfer chamber therebetween,
    a fuel inlet on the fuel heater for directing fuel from the fuel pump to the heat transfer chamber,
    a fuel outlet on the fuel heater for directing fuel from the heat transfer chamber to the carburetor,
    a coolant inlet located on the fuel heater for directing coolant from the engine coolant system to the coolant passageway,
    a coolant outlet located on the fuel heater for directing coolant from the coolant passageway to the engine coolant system, and
    a spiral distributor in flow communication with the fuel inlet and the heat transfer chamber to spiral fuel into the heat transfer chamber.

2. The fuel heater of claim 1, wherein the fuel outlet includes a pressure regulating means for controlling the flow of fuel to the carburetor.

3. The fuel heater of claim 1, wherein the coolant outlet includes a coolant flow monitoring means in flow communicating relation to control the flow of coolant in the fuel heater.

4. The fuel heater of claim 1, wherein the heat transfer chamber is in flow communication with a float chamber, and
    the float chamber having a vapor outlet for returning vapor to the fuel line.

5. The fuel heater of claim 1, wherein the heat transfer chamber includes multiple projections therein to create turbulence in the flow of fuel through said heat transfer chamber.

6. A fuel heater for heating fuel with engine coolant, comprising
    an elongate annular canister having an annular canister wall with ends upon which transverse top and bottom covers are affixed,
    an elongate annular heat transfer wall affixed within the canister and extending from the top cover to the bottom cover along and in spaced relation with the annular canister wall to form a coolant passageway therebetween,
    an elongate annular core affixed within the canister and extending from the top cover to the bottom cover along and in spaced relation to the heat transfer wall to form a heat transfer chamber therebetween,
    a fuel inlet on the fuel heater for directing fuel from the fuel pump into the heat transfer chamber,
    a fuel outlet on the fuel heater for directing heated fuel from the heat transfer chamber to the carburetor,
    a coolant inlet located on the fuel heater for directing coolant from the engine coolant system to the coolant passageway,
    a coolant outlet located on the fuel heater for directing coolant from the coolant passageway to the engine coolant system,
    a spiral distributor in flow communication with the fuel inlet and heat transfer chamber, and
    a float chamber having ports therein in flow communicating relation with the heat transfer chamber.

7. The fuel heater of claim 6, wherein the spiral distributor is in flow communication with a second spiral distributor.

8. The fuel heater of claim 6, wherein the fuel outlet includes a pressure regulating means for controlling the flow of fuel to the carburetor.

9. The fuel heater of claim 6, wherein the coolant outlet includes a coolant flow monitoring means to regulate the flow of coolant in the fuel heater.

10. The fuel heater of claim 6, wherein the heat transfer chamber includes multiple projections therein to create turbulence in the flow of fuel through said heat transfer chamber.

* * * * *